United States Patent [19]

Hashimoto et al.

[11] 4,455,574
[45] Jun. 19, 1984

[54] IMAGE PICKUP DEVICE

[75] Inventors: Seiji Hashimoto; Nobuyoshi Tanaka, both of Kanagawa, Japan

[73] Assignee: Canon Kabushiki Kaisha, Tokyo, Japan

[21] Appl. No.: 377,586

[22] Filed: May 12, 1982

[30] Foreign Application Priority Data

May 15, 1981 [JP] Japan .................................. 56-72230

[51] Int. Cl.³ .............................................. H04N 3/15
[52] U.S. Cl. ................................................. 358/213
[58] Field of Search ....................... 358/213, 212, 221; 357/24 LR

[56] References Cited

U.S. PATENT DOCUMENTS 4,002,824  1/1977  Petrocelli et al. .................. 358/213
4,293,877  10/1981  Tsunekawa et al. ................. 358/221

Primary Examiner—John C. Martin
Assistant Examiner—Victor R. Kostak
Attorney, Agent, or Firm—Toren, McGeady and Stanger

[57] ABSTRACT

The disclosed image pick-up device is provided with a scanning type image sensing arrangement having an image sensing area and a light-shielded area for obtaining an optical black reference, and control means for changing the scanning speeds between said image sensing area and light-shielded area.

6 Claims, 6 Drawing Figures

IMAGE PICKUP DEVICE

BACKGROUND OF THE INVENTION

1. Field of the Invention

This invention relates to image pickup devices, and more particularly to image pickup devices suited for video cameras.

2. Description of the Prior Art

Video cameras and like imaging apparatus utilizing solid state image sensing arrangements, generally avoid a dark current in the solid state image sensing by providing is generally adopted that a light-shielded area in a portion of an image pickup surface of the solid state image sensing arrangement. A signal obtained from this light-shielded area forms a reference of optical black (i.e., a black reference signal).

Up-to-date semiconductor techniques do not allow the number of picture elements in the horizontal line of a solid state image sensing arrangements to reach a level necessary to make the obtained image quality acceptable. Therefore, the number of picture elements which are assigned to the light-shielded area must be made as small as possible. As a result, prior art devices in which many picture elements had to be assigned to the light-shielded area suffered from a low resolution and a low productivity in mass fabrication of such image sensing means.

SUMMARY OF THE INVENTION

With the foregoing in mind, it is an object of the present invention to provide an image pickup device which has achieved a reduction of the number of picture elements in the light-shielded area, thereby it being made possible to improve the resolution and the yield of usable image sensing means obtainable in mass fabrication of image sensing means.

To such end, according to the present invention, the image sensing arrangement having a portion for sensing an image and a light-shielded portion for obtaining an optical black reference, is provided with control means operating to change the scanning speed in transit between the image sensing portion and the light-shielded portion. This constitutes a feature of the image pickup device of the present invention.

In an embodiment of the present invention to be described more fully, when the output signals of the solid state image sensing means are read out, the period of each clock pulse for the light-shielded area is made longer than that of each clock pulse for the image sensing area, thus permitting the number of picture elements assigned to the light-shielded portion to be reduced.

It should be pointed out here that, in case the signal from the aforesaid light-shielded portion is clamped to a predetermined level by a clamping circuit in order to obtain the optical black reference, as is revealed in the embodiment, it is most advantageous that a sample and hold circuit or the like operating in synchronism with the readout timing of the image sensing means be provided in the stage of the signal processing circuit which lies ahead of the aforesaid clamping circuit.

These and other objects and features of the invention will become apparent from the following description of embodiments thereof taken in conjunction with the accompanying drawings.

BRIEF DESCRIPTION OF THE DRAWINGS

In the following, reference to the accompanying drawings, describes preferred embodiments of the present invention. In the accompanying drawings.

DETAILED DESCRIPTION OF THE EMBODIMENTS

Figure 1:
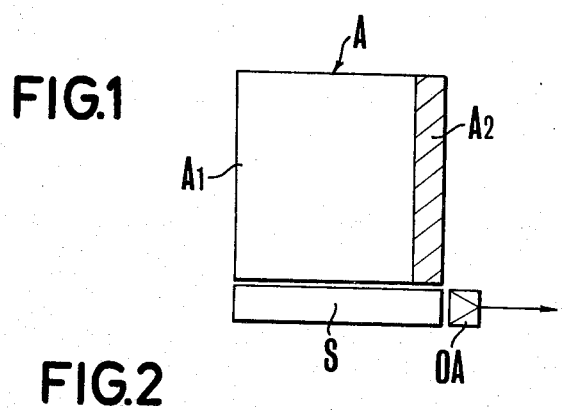
FIG. 1 is a schematic view of the configuration of a solid state image sensing means.

A solid state image sensing arrangement (CCD interline type) is, as illustrated in FIG. 1, formed with an image sensing surface A, a horizontal shift register S for charge transfer (a vertical shift register is not shown here for the purpose of clarity), and an output amplifier OA. This image sensing surface A is divided into an image receiving area A1 and a light-shielded area A2 for obtaining a signal representing the optical black reference. The light-shielded area A2 makes use of a small percentage of the number of horizontal picture elements distributed over the entire area of the image sensing surface. The number of picture elements necessary in this light-shielded area A2 may be roughly calculated as follows: That is, in general, the image sensing means of today has about 390 picture elements in each horizontal line. This array of about 390 cells accounts for an effective scanning period of about 50 $\mu$s for one horizontal line of the field. To achieve a stable D.C. restoration within the scanning period for one horizontal line, it is generally necessary that the width of the clamp pulse of the clamping circuit be at least 2 to 3 $\mu$s. If the image receiving area A1 and light-shielded area A2 are driven by clock pulses of one and the same period, one would conclude that the required number of picture elements in the light-shielded area A2 is about 15 to 25.

Figure 2:
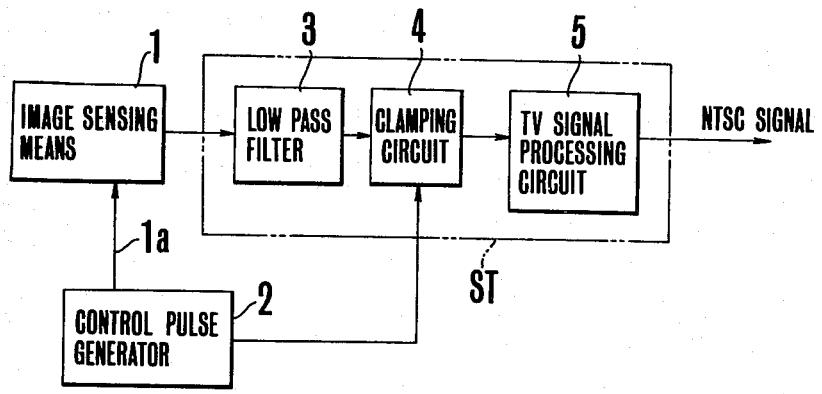
FIG. 2 is a block diagram of one embodiment of an image pickup device according to the present invention.

An embodiment of the present invention is described with reference to FIG. 2. The device of the present invention is constructed from a solid state image sensing means or arrangement 1 having a light-shielded portion as described above in connection with FIG. 1, a control pulse generator 2 for driving this solid state image sensing arrangement 1, and a signal converter circuit ST for converting the output signals read out from the aforesaid solid state image sensing arrangement 1 to desired video signals. In this signal converter circuit ST, a low pass filter 3 passes only the video signals of the outputs readout from the solid state image sensing arrangement 1. A clamping circuit 4 serves for performing D.C. restoration of the video signals in a signal period corresponding to the light-shielded area A2 of the image sensing surface of the solid state image sensing arrangement 1. A television signal processing circuit 5 includes a process encoder for producing NTSC signals for example.

Figure 3:
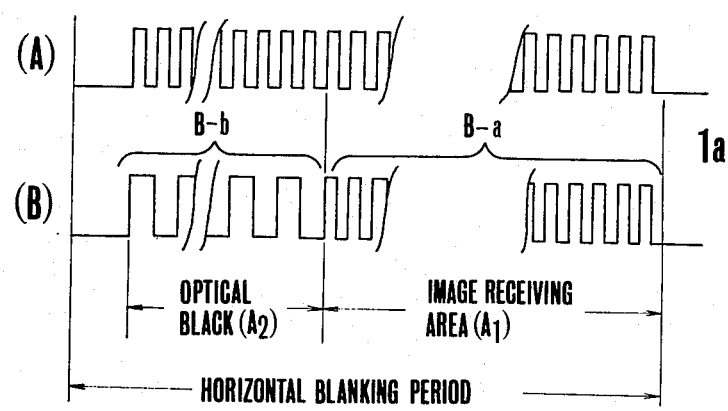
FIGS. 3(A) and 3(B) are waveforms of readout clock pulse trains used in the prior art and the present invention respectively.

The operation of the device of such construction is as follows:

At first, the image sensing arrangement 1 has a picture image projected thereon by an optical system (not shown). Then, the image sensing arrangement 1 is driven by the control pulse generator 2 so that the image data are photo-electrically converted to signal charges which are then read out successively. In more detail, the photo-electrically converted signals are transferred to a vertical shift register (not shown) for charge transfer provided in the image receiving area A1 during the vertical blanking period, and therefrom to the horizontal shift register S for readout during the horizontal blanking period. The horizontal readout shift register S is driven by a clock pulse train 1a as illustrated in FIG. 3(B) from the control pulse generator 2. As is well known, the horizontal shift register S constitutes a scanning arrangement for the image sensing surface A together with the vertical shift register (not shown).

The clock pulse train 1a scanning one horizontal line, has a clock pulse period at the light-shielded portion A2 which is chosen to be, for example, twice that of the clock pulse used in the prior art device. This is illustrated in FIG. 3(A). It offers the advantage that the horizontal length or width of the light-shielded area A2 can be reduced to half of the conventional, and, therefore, the number of cells constituting that portion of the solid state image sensing means which is assigned to the light-shielded area A2 is reduced to about 10 from about 20 in the conventional one.

The output signals read out from the horizontal shift register S in the solid state image sensing arrangement 1 are directed through the output amplifier OA to the signal converter circuit ST where the transferred clock pulses are removed by the low pass filter, permitting only the video signals to be passed therethrough, and, after the D.C. restoration has been reproduced by the clamping circuit 4, responsive to clamp pulses from the control pulse generator 2, in a period corresponding to the light-shielded area A2, they are converted to NTSC signals by the television signal processing circuit 5.

It is to be noted that when, in the aforesaid embodiment, such a clock pulse period falls in the video band, it is of course impossible to remove the transmitted clock pulses by the low pass filter. In this case, the clamping circuit 4 must be a soft clamping circuit.

Figure 4:
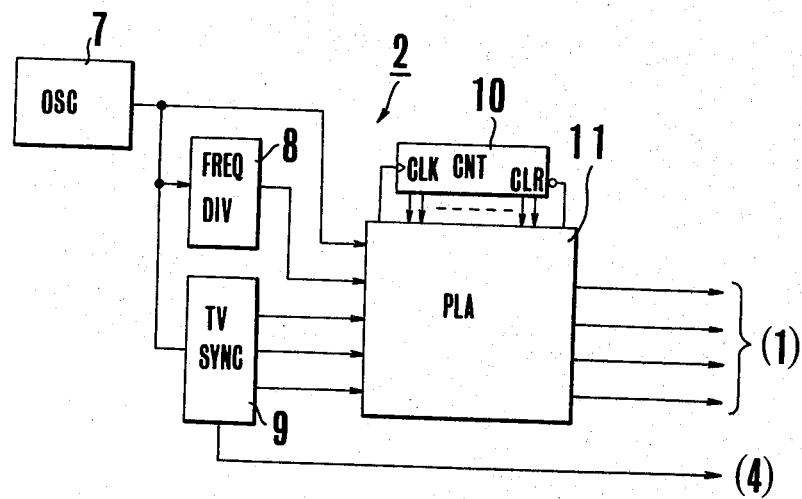
FIG. 4 is a block diagram schematically illustrating a practical example of the control pulse generator in FIG. 2.

Details of the aforesaid control pulse generator 2 appear in FIG. 4. Here, a standard oscillator 7 produces a pulse train serving as a standard on the formation of clock pulses as illustrated by B-a in FIG. 3(B). This is the same as that of FIG. 3(A). A frequency divider 8 divides the frequency of the output pulse train of the oscillator 7 to about ½ to obtain a pulse train serving as a standard on the formation of clock pulses as illustrated by B-b in FIG. 3(B). A TV synchronization pulse generator 9 of known construction receives the output pulses of said oscillator 7 for producing various TV synchronization pulses, (horizontal synchronization pulses, vertical synchronization pulses, etc.) including clamp pulses for the clamping circuit 4. Element 10 is a pulse counter of known construction. A programmable logic array 11 serves as a sensor drive. The content of array 11 is previously programmed so that whilst the operation of the counter 10 is being controlled on the basis of the outputs of the aforesaid oscillator 7, frequency divider 8, TV synchronization pulse generator 9 and pulse counter 10, the various pulse signals necessary to drive the solid state image sensing arrangement 1, namely, readout start pulse, reset pulse for the output portion OA, drive pulse for the vertical shift register and the drive pulse 1a for the horizontal shift register S illustrated in FIG. 3(B) are produced. Here, its output is applied to the element 1, so that the above-described functions concerned with the signal readout can be obtained.

It is to be noted here that the longer the clock period of the pulse B-b, the smaller the number of picture elements in the light-shielded area A2 can be made. It is natural that the clamp pulse for clamping circuit 4 is made to occur at the output of the TV synchronization pulse generator 9 within the period when the light-shielded area A2 is read out, that is, the horizontal blanking period.

Figure 5:
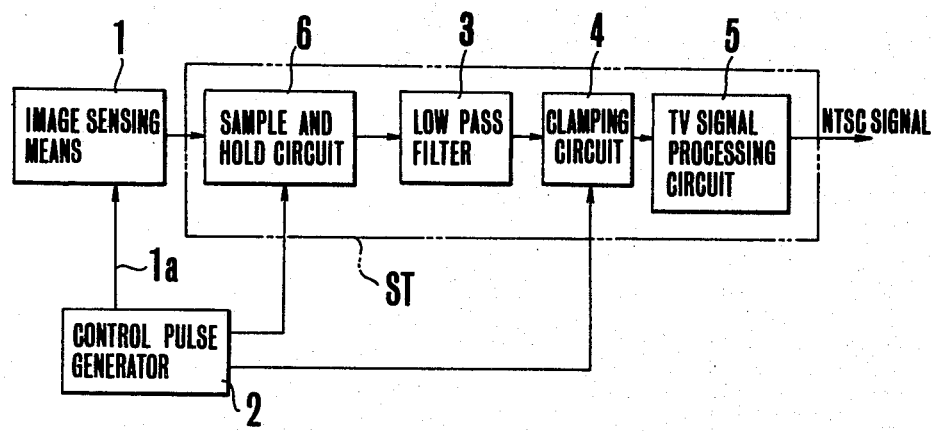
FIG. 5 is a block diagram of another embodiment of the image pickup device according to the present invention.

FIG. 5 shows another embodiment of the present invention. In FIG. 5, the same reference characters have been employed to denote parts similar to those shown in FIG. 2, and their explanation is omitted. In this embodiment, a sample and hold circuit 6 operating in synchronism with the readout timing from the solid state image sensing arrangement 1 is connected between the solid state image sensing arrangement 1 and the low pass filter 3. In this case, the output signals read out from the solid state image sensing means 1 are sampled and held in synchronism with the readout timing by the sample and hold circuit 6. This affects the required number of picture elements in each horizontal line of the light-shielded area A2 for giving the optical black reference level. In principle, if there is at least one picture element, the optical black reference level can be held at a duty ratio of nearly 100% by the aforesaid sample and hold circuit 6 without depending upon the clamp pulse width. Therefore, according to this embodiment, a possibility of further reducing the number of picture elements in the light-shielded area A2 can be achieved with advantages that the degree of resolution is greatly increased, and the yield of usable image sensing means obtainable in mass fabrication of such image sensing means can be further improved. In practice, the number of picture elements to be assigned to the light-shielded area A2 in this respect may be taken at a desired value, provided that the content of the programmable logic array 11 in the circuit of FIG. 4 is so preset. Also the sampling pulse for the sample and hold circuit 6 may be formed by using the drive pulse 1a for the horizontal register S in a way known in the art.

As has been described in detail, the present invention achieves an image pickup device having an image receiving area and a light-shielded area on the image sensing surface of imaging means and operates so that the output signals from said imaging means are read out with the possibility of substantially reducing the number of picture elements assigned to the light-shielded area. This increases the degree of resolution and improves the yield of usable image sensing means. Further, as is evident from the embodiments, the use of the sample and hold circuit between the clamping circuit that receives the readout outputs from the imaging means for D.C. restoration in the period corresponding to the shielded area and the imaging means permits this black reference level to be held at a duty ratio of nearly 100% without the necessity of providing more than one picture element in each horizontal line for the light-shielded area in principle. Thus, the required number of picture elements in the light-shielded area can be further reduced.

What is claimed is:

1. An image pickup device comprising:

(A) an image sensing surface having a first portion for obtaining image signals and a second portion for obtaining an optical black reference;
(B) means for scanning said image sensing surface; and
(C) means for controlling the scanning means to change the scanning speed of said scanning means between said first portion and said second portion.

2. An image pickup device as described in claim 1, wherein said control means is formed to control the speed of scanning so that the speed of scanning of the second portion of said image sensing surface is slower than that of scanning the first portion.

3. An image pickup device as described in claim 2, wherein said second portion of said image sensing surface is located on said image sensing surface to be able to obtain the optical black reference in a horizontal blanking period of a standard television.

4. An image pickup device as described in claim 1, or 2, or 3, further including:
means for clamping at least a part of those of the signals obtained by scanning said image sensing surface by said scanning means which correspond to said second portion to a predetermined level to obtain the optical black reference.

5. An image pickup device as described in claim 4, wherein said image sensing surface has one array of a plurality of photo-electric transducer elements.

6. An image pickup device as described in claim 5, further including:
means positioned in the preceding stage of said clamp means for sampling and holding the signals of the individual photo-electric transducer elements constituting said image sensing surface; and wherein
said clamp means clamps those of the signals sampled and held by said sample and hold means which correspond to said second portion to the said predetermined level.

* * * * *